United States Patent [19]
Del Duca

[11] Patent Number: 4,589,533
[45] Date of Patent: May 20, 1986

[54] CLUTCH AND BRAKE ASSEMBLY

[76] Inventor: Matteo E. Del Duca, 2530 Everts, Windsor, Ontario N9E 2T7, Canada

[21] Appl. No.: 471,090

[22] Filed: Mar. 1, 1983

[51] Int. Cl.$^4$ .............................................. F16D 67/04
[52] U.S. Cl. .................................. 192/18 A; 192/12 C
[58] Field of Search ............................. 192/18 A, 12 C

[56] References Cited

U.S. PATENT DOCUMENTS

| | | | |
|---|---|---|---|
| 2,180,218 | 11/1939 | Wissman | 192/18 A |
| 2,304,350 | 12/1942 | Gillett | 192/12 C |
| 2,313,187 | 3/1943 | Williamson | 192/18 A |
| 2,472,452 | 6/1949 | Wissman | 192/18 A |
| 2,505,600 | 4/1950 | Wissman | 192/18 A |
| 2,626,581 | 4/1953 | Bitler | 192/18 A |
| 2,674,356 | 4/1954 | Eason | 192/18 A |
| 2,785,781 | 3/1957 | Johansen | 192/12 C |
| 2,862,589 | 12/1958 | Porteous et al. | 192/18 A |
| 2,890,773 | 6/1959 | Martindell | 192/18 A |
| 2,918,832 | 12/1959 | Meyers | 192/18 A |
| 2,942,708 | 6/1960 | Eason | 192/18 A |
| 3,077,252 | 2/1963 | Treer | 192/18 A |
| 3,135,289 | 6/1964 | Jordan | 192/12 C |
| 3,283,862 | 11/1966 | Warnock | 192/18 A |
| 3,888,097 | 6/1975 | Fortman et al. | 192/18 A X |
| 4,071,940 | 2/1978 | Hazelton | 192/18 A X |

FOREIGN PATENT DOCUMENTS

| | | | |
|---|---|---|---|
| 1162693 | 2/1964 | Fed. Rep. of Germany | 192/18 A |
| 0273590 | 6/1970 | U.S.S.R. | 192/18 A |
| 0759772 | 8/1980 | U.S.S.R. | 192/18 A |

*Primary Examiner*—Rodney H. Bonck
*Attorney, Agent, or Firm*—Cullen, Sloman, Cantor, Grauer, Scott & Rutherford

[57] ABSTRACT

A fluid operated clutch and brake assembly is adapted to be connected to a motor driven flywheel and a rotatable drive shaft for a press or the like. A fluid operated piston mounted on the flywheel simultaneously engages the clutch and disengages the brake. The brake is spring biased to automatically stop rotation of the shaft when the clutch is disengaged. A first portion of the assembly mounted for rotation with the flywheel includes a fluid cylinder, a piston and a pair of spring biased clutch plates which are axially displaceable by the piston. A second portion mounted for rotation on the drive shaft includes two spline plates and a brake plate and a double splined hub, the spline plates being axially slidable on the splines of the hub. The brake plate is normally biased into frictional engagement with a stationarily mounted brake. Actuation of the piston engages the clutch plates with the spline plates and disengages the brake plate.

5 Claims, 5 Drawing Figures

CLUTCH AND BRAKE ASSEMBLY

TECHNICAL FIELD

The present invention broadly relates to clutch devices, especially those employed with motor driven flywheels, and deals more particularly with a clutch device employing a brake.

BACKGROUND ART

Various types of power operated clutch and brake combinations have been devised in the past for application in machines, particularly those having a motor driven flywheel. Machines such as presses employ rotatable shafts for driving a platten or the like using the large amount of inertia developed by the flywheel. The inertia of both the flywheel and the operating parts of the machine dictate the need for a brake device for terminating operation of the machine when the clutch disengages the flywheel from the drive shaft.

Prior art devices of the general type described above are less than completely satisfactory in several respects, particularly in terms of their effectiveness and complexity. The present invention provides a clutch and brake assembly which overcomes these problems and is also both more safe and reliable compared to known prior art devices.

SUMMARY OF THE INVENTION

Accordingly, it is a primary object of the present invention to provide an improved, fluid operated clutch and brake assembly which is adapted to be connected between a motor driven flywheel and a rotatable drive shaft for a machine such as a press or the like. A hydraulically or pneumatically operated piston mounted on the flywheel simultaneously engages the clutch and disengages the brake. The brake is spring biased to automatically stop rotation of the shaft when the clutch is disengaged. A first portion of the assembly mounted for rotation with the flywheel includes a fluid cylinder, the piston and a pair of spring biased clutch plates which are axially displaceable by the piston. A second portion is mounted for rotation on the drive shaft and includes two spline plates and a brake plate as well as a double splined hub, the spline plates being axially slidably on the splines of the hub. Actuation of the piston engages the clutch plates with the spline plates and disengages the brake plate from a stationary brake member.

DETAILED DESCRIPTION OF THE INVENTION

In the drawings, which form an integral part of the specification and are to be read in conjunction therewith, and in which like reference numerals are employed to designate identical parts in the various views.

BEST MODE FOR CARRYING OUT THE INVENTION

Figure 1:
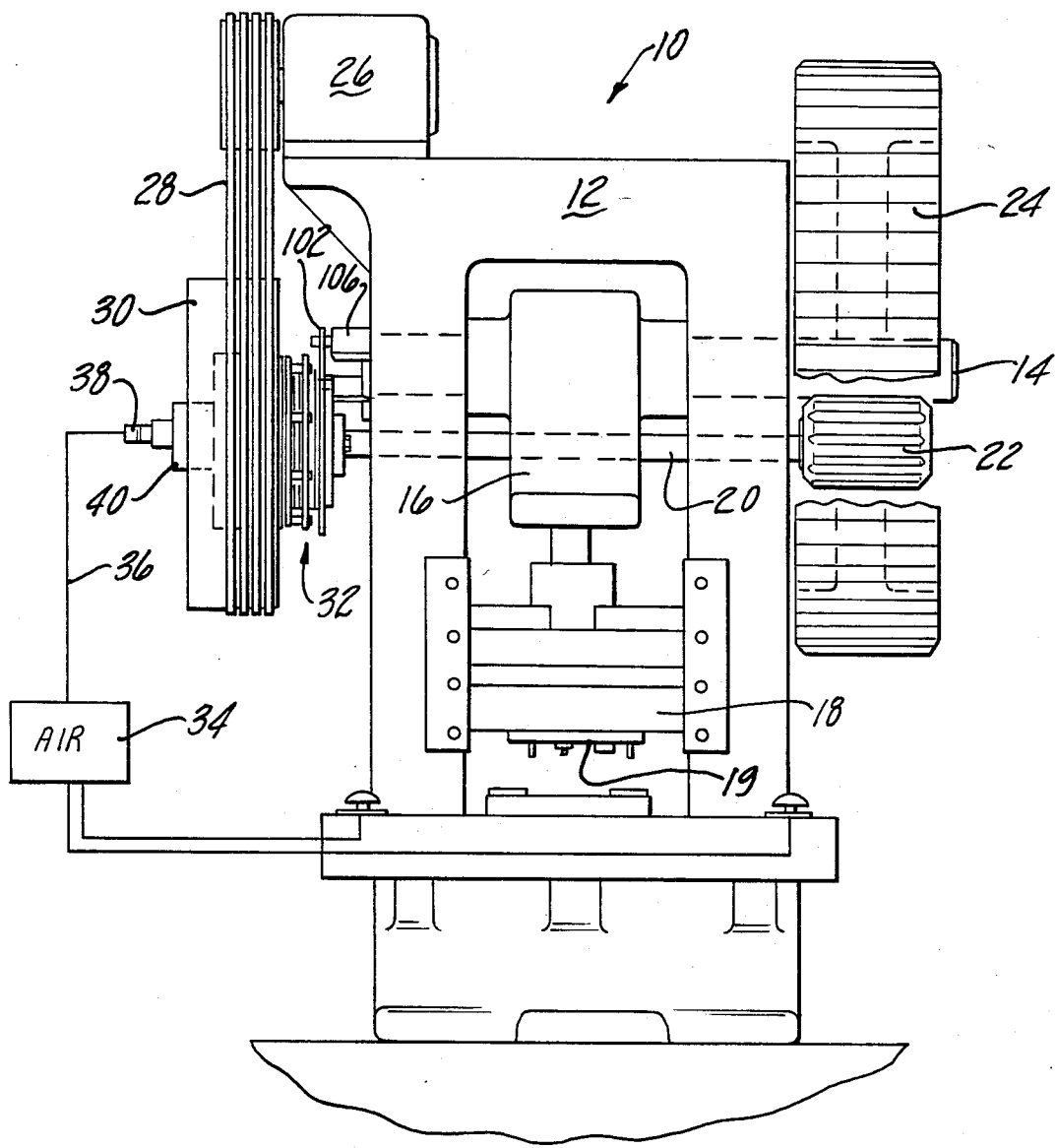
FIG. 1 is a front elevational view of a press machine employing the clutch and brake assembly which form the preferred embodiment of the present invention.
Figure 2:
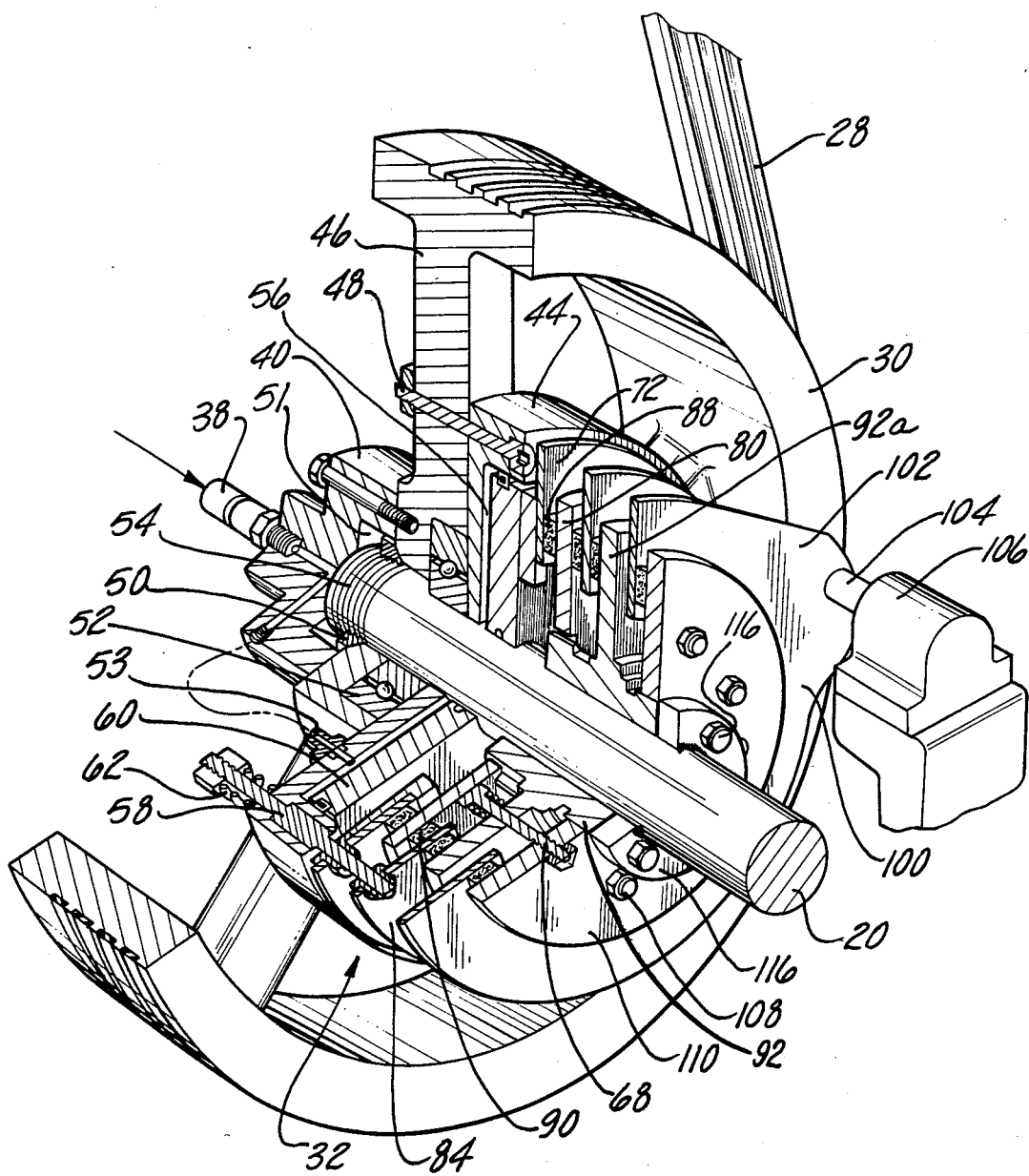
FIG. 2 is a perspective view of the clutch and brake assembly mounted on the flywheel of the machine shown in FIG. 1, parts being broken away in section for clarity.
Figure 3:
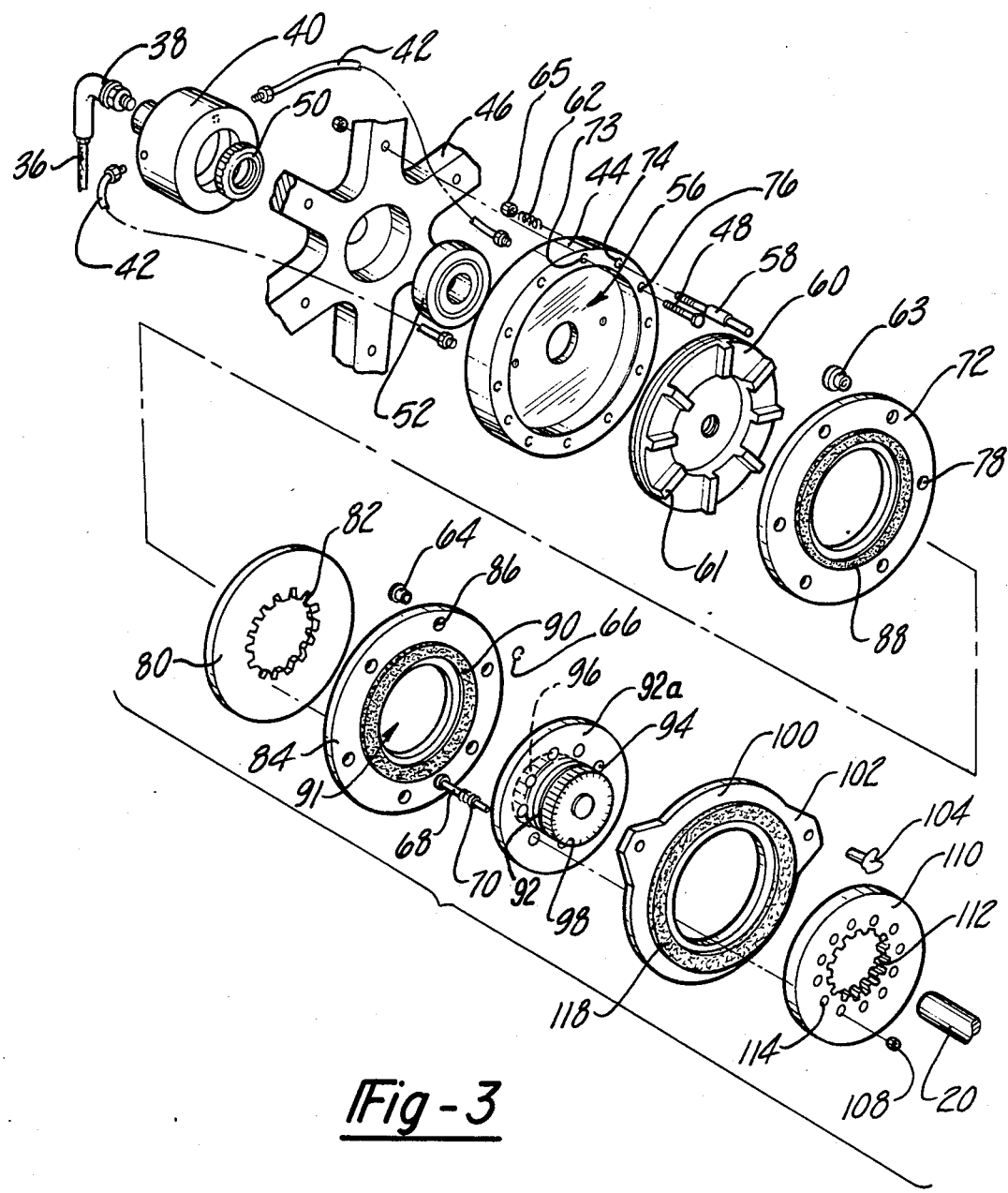
FIG. 3 is an exploded, perspective view of the clutch and brake assembly of the present invention.

Referring first to FIG. 1, a machine such as a press generally indicated by the numeral 10 includes a supporting frame 12 upon which there is reciprocably mounted a platen 18 provided with a die 19 for operating on a workpiece (not shown). A motor 26 mounted on frame 12 drives a flywheel 30 through belts 28. Flywheel 30 is connected through a clutch and brake assembly 32 to one end of a drive shaft 20. The other end of drive shaft 20 is provided with a gear member 22 which meshingly engages a larger gear 24. The gear 24 is connected to one end of crankshaft 14, there being provided a crank 16 connecting the platten 18 with crankshaft 14. It may thus be appreciated that when the clutch and brake assembly 32 is engaged, motor 26 drives flywheel 30 which in turn drives the crankshaft 14 through gears 22 and 24 and drive shaft 20.

Referring now also to FIGS. 2–5, the clutch and brake assembly 32 includes a fluid manifold 40 secured to one side of flywheel 30 which is adapted to be coupled with an air supply line 36 via a swivel coupling 38. Supply line 36 is in turn coupled with a suitable source of pressurized air 34. Fluid manifold 40 includes a pair of fluid outlet lines 42 which are in turn coupled with the interior of a cylinder 44 by means of couplings 53. Manifold 40 includes a cylindrical cutout 51 therein for receiving the threaded end 54 of drive shaft 20, there being provided a collar 50 which is keyed to drive shaft 20 to prevent longitudinal displacement of drive shaft 20. A bearing 52 provided in flywheel 30 journals the drive shaft 20 for rotation in the center of flywheel 30.

The clutch and brake assembly 32 broadly includes a first portion mounted for rotation on flywheel 30 and a second portion mounted for rotation on drive shaft 20. The first portion of the clutch and brake assembly 32 comprises cylinder 44, piston 60 and clutch plates 72 and 84. The second portion includes a spline hub assembly consisting of spline hub 92 and plates 80, 92a and 110. As will be discussed further below, a stationary brake member 100 forms a portion of the assembly 32.

Cylinder 44 is provided with a cylindrical cavity 56 therein and is secured to the spokes 46 of flywheel 30 by means of screws 48 extending through bores 73 circumferentially spaced around the periphery of cylinder 44. Fluid distributed by manifold 40 enters the cavity 56 through a pair of spaced apart fluid inlets 53. Piston 60 includes a substantially flat piston plate having a plurality of circumferentially spaced spacing blocks 61 mounted on the outer face thereof. Piston plate 60 is mounted for sliding movement longitudinally relative to the axis of drive shaft 20. Fluid within the cavity 56 is prevented from leaking out around the edges of piston plate 60 by a pair of circumferentially extending seals 120 and 122 best seen in FIGS. 4 and 5.

Figure 4:
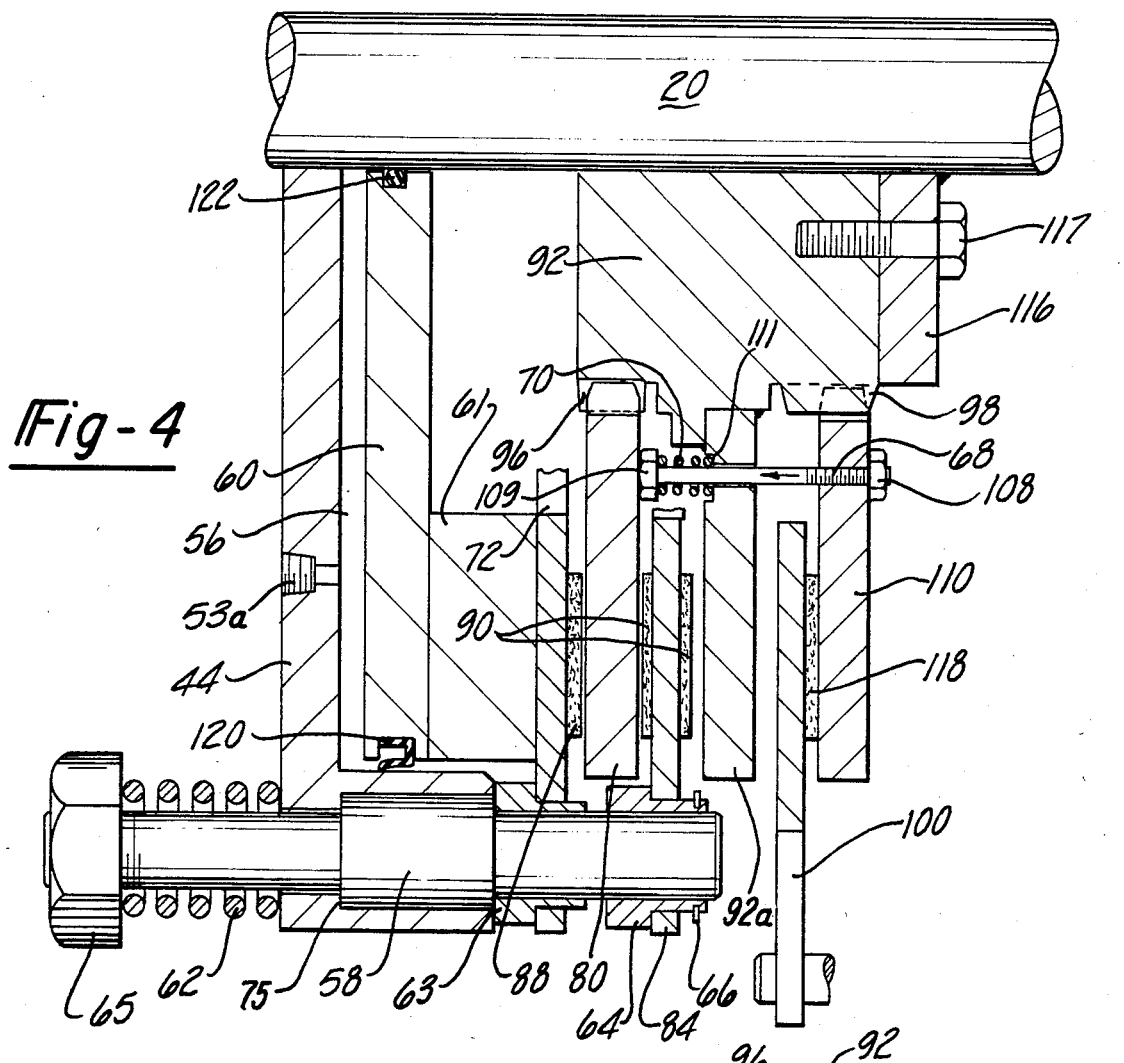
FIG. 4 is a cross sectional view of half of the clutch and brake assembly, depicting the assembly in a disengaged state; and, .
Figure 5:
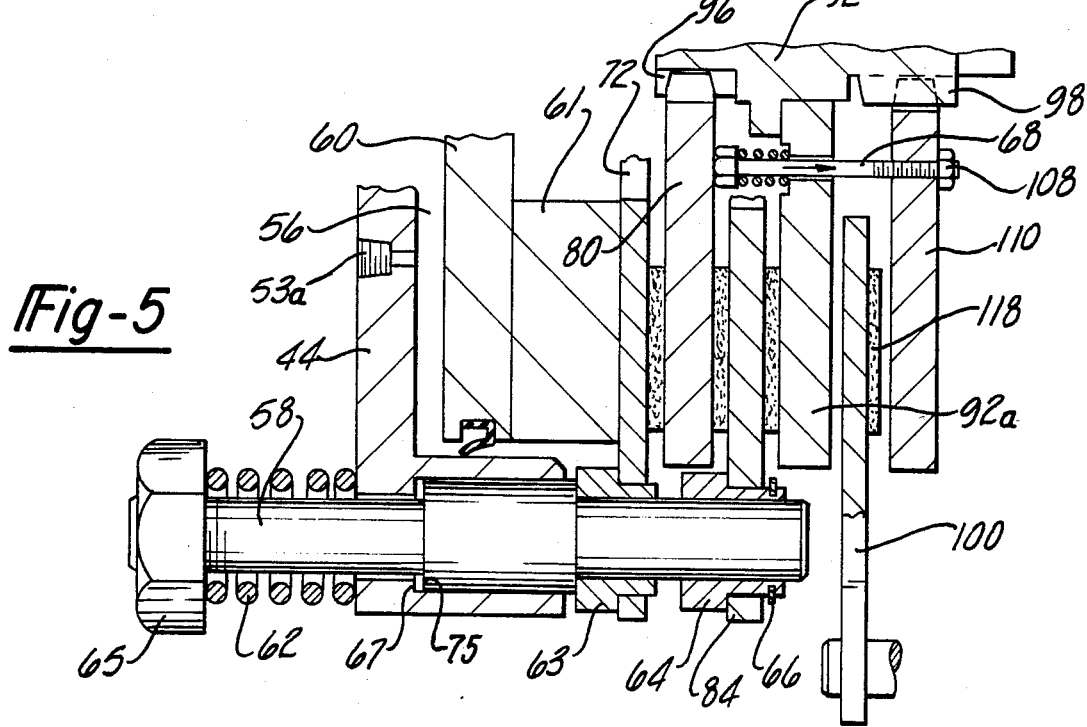
FIG. 5 is a view similar to FIG. 4 but showing the clutch and brake assembly in an engaged state.

Clutch plates 72 and 84 are each mounted for longitudinal sliding movement by means of a plurality of guide pin assemblies. The guide pin assemblies comprise a plurality of guide pins 58 mounted for sliding longitudinal movement in respectively associated, circumferentially spaced apertures 74 around the periphery of cylinder 44. Guide pins 58 are biased to slide toward the left as viewed in FIGS. 4 and 5 by means of compression springs 62 sleeved over one end of guide pins 58, there being provided retaining nuts 65 on the ends of the guide pins 58 for retaining springs 62. Movement of the guide pin 58 toward the left as viewed in FIGS. 4 and 5 is limited by an annular shoulder 75 which seats against an annular rim 67 in cylinder 44.

One side of clutch plate 72 is essentially smooth and abuts the spacing blocks 61 of piston 60, while the other side thereof is provided with clutch pads 88 of wear resistant frictional material. Clutch plate 84 is similarly provided with circumferentially extending clutch pads 90 on opposite faces thereof.

Clutch plate 72 is provided with a plurality of circumferentially spaced holes 78 therein each provided with a bushing 63 for slidably receiving the outer end of guide pin 58. Similarly, clutch plate 84 is likewise provided with a plurality of circumferentially spaced holes 86 therein which are longitudinally aligned with holes 78 and are provided with bushings 64 for receiving the outer end of guide pin 58 therein. Retaining elements 66 in bushings 64 secure bushings 64 and clutch plate 84 to guide pin 58.

Spline hub 92 is fixedly secured to drive shaft 20 by means of an annular collar 116 secured as by welding to shaft 20 and bolts 117 extending through collar 116 into spline hub 92. Spline hub 92 is provided with a pair of longitudinally spaced splines defined by spline teeth 96 and 98. Spline plate 80 includes a central aperture therein defined by teeth 82 around the periphery thereof which meshingly engage spline teeth 96, thus mounting spline plate 80 on spline hub 92a for a slight degree of longitudinal movement relative to the axis of drive shaft 20. Spline plate 92 is secured as by welding to a central section of spline hub 92 and is provided with a plurality of apertures 94 therein for purposes which become later apparent. A brake plate 110 is provided with central aperture therein defined by spline teeth 112 around the periphery thereof which meshingly engage spline teeth 98, thereby mounting brake plate 110 for longitudinal sliding movement on spline hub 92. Brake plate 110 is also provided with a plurality of circumferentially spaced apertures 114 which are longitudinally aligned with apertures 94 in spline plate 92a.

A drive pin 68 extends through apertures 94 and 112 and is provided with a nut 108 on one end thereof engaging the outer face of brake plate 110, the opposite end of drive pin 68 having a head 109 adapted to engage one face of spline plate 80. A compression spring 70 is captured between head 109 and a recess 111 in spline plate 92a, thereby biasing drive pin 68 toward the left as viewed in FIGS. 4 and 5. Clutch plate 84 possesses a central, circular opening 91 therein of sufficient diameter to allow both the drive pin 68 and spline teeth 96 to pass therethrough and allow unrestricted rotation of clutch plate 84.

Brake member 100 comprises an annular plate member having an elongation 102 which is stationarily secured by shaft 104 to a support 106 on frame 12. A circumferentially extending brake pad 118 is secured to one face of brake member 100 and is adapted to frictionally engage brake plate 110 as will be discussed further below. Spline plate 92a is disposed between brake member 100 and clutch plate 84 and is adapted to frictionally engage the clutch pad 90 on one face of clutch plate 84. Spline plate 80 is disposed between clutch plate 72 and 84, the opposite faces of spline plate 80 being adapted to frictionally engage clutch pads 88 and 90 on clutch plates 72 and 84.

In operation, the clutch and brake assembly 32 is adapted to selectively connect the flywheel 30 in driving relationship to drive shaft 20 when the clutch is engaged and apply braking force to drive shaft 20 when the clutch is disengaged. Referring now particularly to FIG. 4 which depicts the assembly 32 in a state where the clutch is disengaged and the brake is engaged, fluid pressure is released from cavity 56 thus allowing spring 62 to bias guide pins 58 toward the left; this biasing action draws clutch plates 72 and 84 out of engagement with spline plates 80 and 92 thus allowing the first portion consisting of cylinder 44, piston plate 60, and clutch plates 72 and 84 to rotate freely with flywheel 30. With the piston plate 60 retracted within cylinder 44 and clutch plate 72 displaced toward the left as viewed in FIGS. 4 and 5, clearance is created to allow the drive pin 68 to displace spline plate 80 in a direction toward piston 44; this displacement of drive pins 68 also draws brake plate 110 into frictional engagement with brake pad 118 thereby preventing rotation of spline hub 92 and drive shaft 20.

Referring now to FIG. 5, pressurized fluid delivered through inlets 53 into cavity 56 results in the displacement of piston plate 60 toward the right, causing spacing blocks 61 to likewise displace clutch plates 72. Clutch pad 88 bears against spline plate 80, forcing the latter to be displaced toward the right; this latter mentioned displacement of spline plate 80 also displaces drive pins 68 against the biasing influence of spring 70, thereby releasing brake plate 110 from engagement with brake member 100 and the associated pad 118. Continued extension of the piston of the piston plate 60, clutch plate 72 and spline plate 80 results in the clutch pads 90 respectively engaging the opposing faces of spline plates 80 and 92a. With clutch plates 72 and 84 pressed tightly against spline plates 80 and 92a, the clutch is engaged and torque is transmitted from the flywheel 30 to the drive shaft 20, causing the latter to rotate.

In order to disengage the clutch, pressure is relieved from cavity 56 and the biasing influence of spring 62 shifts clutch plates 72 and 84 out of engagement with spline plates 80 and 92a thereby disengaging the clutch. Simultaneously, the biasing influence of spring 70 shifts the brake plate 110 out of engagement with brake pad 118, thereby applying braking force to the brake member 100 in order to halt rotation of drive shaft 20. The same braking procedure described above occurs in the event that fluid pressure is lost in cylinder 44 for any reason, such as the failure of a fluid supply line.

From the foregoing, it is apparent that the clutch and brake assembly of the present invention not only provides for the accomplishment of the objects of the invention but does so in a particularly effective and efficient manner. It is recognized, of course, that those skilled in the art may make various modifications or additions to the preferred embodiment chosen to illustrate the invention without departing from the spirit and scope of the present contribution to the art. Accordingly, the protection sought and to be afforded hereby should be deemed to extend to the subject matter claimed and all equivalents thereof fairly within the scope of the invention.

What is claimed is:

1. For use with a machine having a motor, a rotatable flywheel driven by said motor and a rotatable output shaft adapted to be driven by said flywheel, a clutch and brake assembly coupled between said flywheel and said shaft, said clutch and brake assembly having an engaged state for drivingly coupling said flywheel with said shaft and a disengaged state for disengaging said flywheel from said shaft, said clutch and brake assembly comprising:
- a cylinder secured on said flywheel for rotation therewith and adapted to be coupled with a source of pressurized fluid;
- a piston reciprocally mounted within said cylinder and adapted to be longitudinally displaced along the axis of said shaft by the pressure of fluid on said piston;
- a spline hub assembly mounted on said shaft for rotation therewith including
  (1) a first plate circumscribing said shaft,
  (2) a spline hub secured to said shaft and defining first and second splines on opposite sides of said first plate, said first plate being secured to said hub,
  (3) second and third plates respectively drivingly coupled with and axially slidable on said first and second splines, said first plate being disposed between said second and third plates,
- brake means stationarily mounted on said machine and disposed between said first and second plates for frictionally engaging said second plate;
- means for normally biasing said second plate into frictional engagement with said brake means when said clutch assembly is in said disengaged state thereof to prevent rotation of said shaft;
- clutch plate means driven by longitudinal displacement of said piston for frictionally coupling said piston with said spline hub assembly when said clutch assembly is in said engaged state thereof to drivingly connect said flywheel with said shaft;
- brake release means driven by longitudinal displacement of said piston for defeating said biasing means and disengaging said brake means from said second plate when said clutch assembly is in said engaged state; and
- means for mounting said clutch plate means for rotation with said cylinder and for longitudinal displacement relative to said cylinder, said mounting means including a plurality of guide pins slidably mounted on said cylinder, means for normally biasing said guide pins to slide relative to said cylinder and means for securing said clutch plate means on said guide pins.

2. The clutch and brake assembly of claim 1, wherein said clutch plate means includes first and second clutch plates, said first clutch plate being disposed between said piston and said third plate and including surface areas for frictionally engaging said third plate, said second clutch plate being disposed between said first and third plates and including surface areas on opposite sides thereof for respectively frictionally engaging said first and third plates.

3. The clutch and brake assembly of claim 2, wherein said securing means includes a plurality of bushings respectively secured to said first and second clutch plates and sleeved over said guide pins.

4. For use with a machine having drive means including a motor and a rotatable output shaft adapted to be rotated by said drive means, a combination clutch and brake apparatus actuable from a first state wherein said clutch is disengaged and said brake is engaged to prevent rotation of said shaft to a second state in which said clutch is engaged and said brake is disengaged to allow said shaft to be rotated by said drive means, said apparatus comprising:
- a first portion secured to said drive means for rotation by the latter, including
  (1) a motor member having a drive member axially shiftable relative to said shaft,
  (2) first and second spaced apart clutch plates,
  (3) means for mounting said first and second clutch plates for axial movement relative to said shaft, at least one of said clutch plates being drivingly connected with said drive member, said mounting means including a plurality of guide pins slidably mounted on said motor member, said first and second clutch plates being mounted on said guide pins;
- a second portion stationarily mounted on said machine and having frictionally engagable surfaces;
- a third portion mounted on said shaft for rotation therewith, including
  (1) a hub secured to said shaft,
  (2) a first plate secured to said hub and adapted to frictionally engage said second clutch plate when said apparatus is in said second state thereof to drivingly couple said drive means with said third portion,
  (3) a second plate including surface areas adapted to frictionally engage said second portion and being axially slidable on said hub between a first position engaging said second portion when said apparatus is in said first state thereof to prevent rotation of said third portion and a second position disengaged from said second portion when said apparatus is in said second state thereof to allow rotation of said third portion with said first portion; and
- means extending through said first plate for shifting said second plate between said first and second positions thereof.

5. The apparatus of claim 4, including means for biasing said first and second clutch plates to slide relative to said cylinder.

* * * * *